United States Patent [19]

Laessig

[11] Patent Number: 5,274,944
[45] Date of Patent: Jan. 4, 1994

[54] TIP-UP

[76] Inventor: Kenneth R. Laessig, 2232 S. 31st St., Milwaukee, Wis. 53215

[21] Appl. No.: 980,123

[22] Filed: Nov. 23, 1992

Related U.S. Application Data

[63] Continuation of Ser. No. 636,131, Dec. 31, 1990, abandoned.

[51] Int. Cl.$^5$ .............................................. A01K 97/12
[52] U.S. Cl. ............................................................ 43/17
[58] Field of Search ............................................ 43/17

[56] References Cited

U.S. PATENT DOCUMENTS

| | | | |
|---|---|---|---|
| 2,663,962 | 12/1953 | King | 43/17 |
| 3,739,514 | 6/1973 | Odney | 43/17 |
| 4,253,262 | 3/1981 | Johnson | 43/17 |
| 4,373,287 | 2/1983 | Grahl | 43/17 |
| 4,567,686 | 2/1986 | Akom | 43/17 |
| 4,642,930 | 2/1987 | Graf | 43/17 |
| 4,790,099 | 12/1988 | Miller | 43/17 |
| 4,805,336 | 2/1989 | Heyerman | 43/17 |
| 4,980,986 | 1/1991 | Harper | 43/17 |
| 4,996,788 | 3/1991 | Wieting | 43/17 |

*Primary Examiner*—Kurt C. Rowan
*Attorney, Agent, or Firm*—Andrus, Sceales, Starke & Sawall

[57] ABSTRACT

This invention relates to an ice fishing tip-up and more particularly to a means for activating an audible or visual indicator to alert a fisherman when a fish has engaged a hook of the ice fishing tip-up. The device is comprised of a switch which interconnects the audible or visual indicator to a power source. The switch has terminals normally biased toward a closed position whereby a first terminal is in contact with a second terminal. An insulator is placed between the terminals of the switch such that the terminals are not in contact. The insulator is then removed from between the terminals in response to an increase in tension in the fishing line when a fish strikes the hook. The removal of the insulator from between terminals causes the switch to close, thereby activating the audible or visual signal to alert the fisherman.

6 Claims, 2 Drawing Sheets

TIP-UP

The present application is a continuation application of U.S. patent application Ser. No. 07/636,131, filed Dec. 31, 1990, now abandoned.

BACKGROUND OF THE INVENTION

This invention relates to an ice fishing tip-up and more particularly to a means for activating an audible or visual signal to alert a fisherman when a fish has engaged the hook of the ice fishing device.

The prior art discloses a plurality of devices for alerting a fisherman that a fish has struck the hook of an ice fishing apparatus. Wieting et al U.S. Pat. No. 4,996,788 is directed to a ice fishing apparatus utilizing three distinct means for alerting the fisherman of a strike. The Wieting et al patent is directed toward a tip-up formed out of a transparent material to house an illumination means therein. In addition, upon activation of the tip-up, the device simultaneously relays an audible and an additional visual signal to the fisherman. The means for activating the audible and visual signal is comprised of an electrified coil spring which completes a circuit when the tip-up is in the signaling position.

Odney U.S. Pat. No. 3,739,514 shows a fishing device and a signaling system indicating the presence of a fish striking the bait. When the fish strikes the bait, the upward movement of the fishing line support member causes the closing of a switch element which activates the audible and visual signal.

In view of the prior art, it would be desirable to develop a more efficient means for activating the audible and/or visual signal alerting the fisherman that a fish has struck the bait.

SUMMARY OF THE INVENTION

This invention is directed towards a device for activating an audible and/or visual indicator on a fishing tip-up. A spool and a fishing line wound on the spool are also provided.

The device is comprised of a switch interconnecting the audible and/or visual indicators to a power source. The switch has first and second terminals normally biased toward a closed position wherein the first terminal is in contact with the second terminal. An elongated, flexible pole having a flag a fixed is provided. The pole is movable from a first set position whereby the tip of the pole is bent and maintained in position by the spool and a second alert position whereby the pole is upright. The pole is responsive to an increase of tension in the fishing line. When a fish strikes the line, the fishing line unwinds from the spool thereby releasing the pole from the set position to the alert position.

To set the device, an insulator, such as the flag or a section of fishing line, is placed between the first and second terminals of the switch such that the first and second terminals are not in contact. In the case of the flag being used as the insulator, the movement of the pole from the first set position to the second alert position, removes the flag from between the terminals. This allows the terminals to make contact with each other, thereby closing the switch and activating the audible and/or visual indicator.

Likewise, if fishing line is used as the insulator, an increase in tension in the fishing line will remove the line from between the first and second terminals of the switch such that the audible and/or visual indicators are activated.

A method is also provided for activating an audible and/or visual indicator on an ice fishing tip-up having a spool and a fishing line wound on the spool. The method is comprised of providing a switch to interconnect the audible and/or visual alarm to a power source. The switch has first and second terminals normally biased toward a closed position such that the first terminal is in contact with the second terminal. The method is further comprised of providing an insulator between the terminals of the switch such that the first and second terminals are not in contact. By removing the insulator from between the terminals in response to an increase in tension in the fishing line, the switch closes, thereby activating the audible and/or visual alarm.

A flexible elongated pole is provided having first and second ends. A flag is affixed to the pole. The pole is movable from a first set position to a second erect, alert position in response to an increase in tension in the fishing line. When the pole is in the set position, the flag may be used as the insulator between the terminals of the switch. Likewise, the insulator may be comprised of a section of fishing line.

Therefore, an objective of this invention is a device for activating an audible and/or visual indicator on an ice fishing tip-up.

A further objective is to provide a switch which is normally biased in a closed position to interconnect audible and/or visual indicators to a power source such that the indicators are activated in response to an increase in tension in the fishing line.

These and other objectives will become evident throughout this disclosure.

DETAILED DESCRIPTION OF THE DRAWINGS

Figure 1:
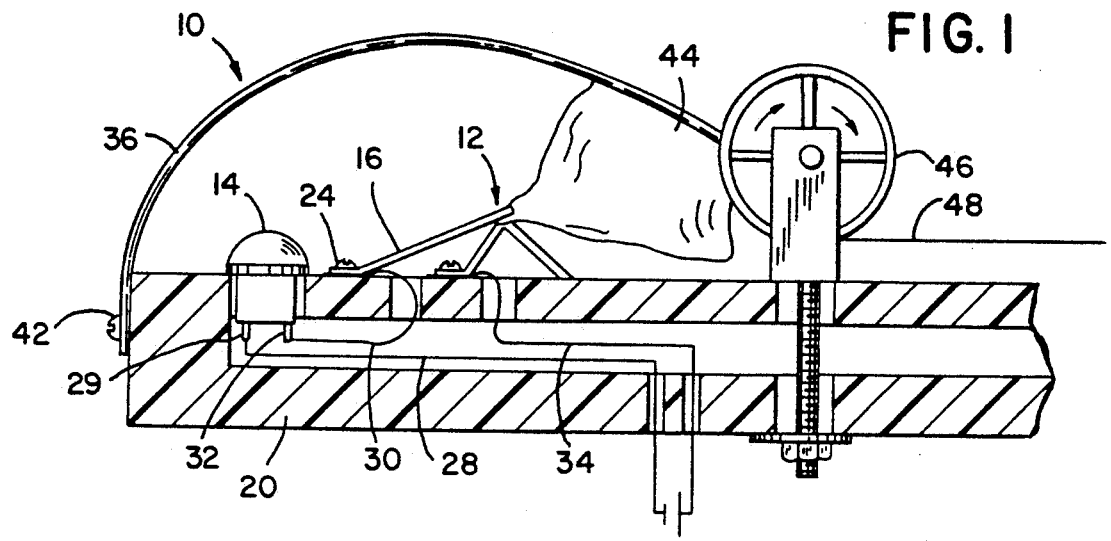
FIG. 1 is a perspective view of the invention with an insulator opening the switch.

The construction and operation of the tip-up utilizing the signal activating device of the present invention is shown in U.S. Pat. No. 4,373,287.

The invention is generally designated by the reference numeral 10. The invention is comprised of a switch 12 interconnecting a visual indicator 14 to a power source, FIG. 1.

Figure 2:
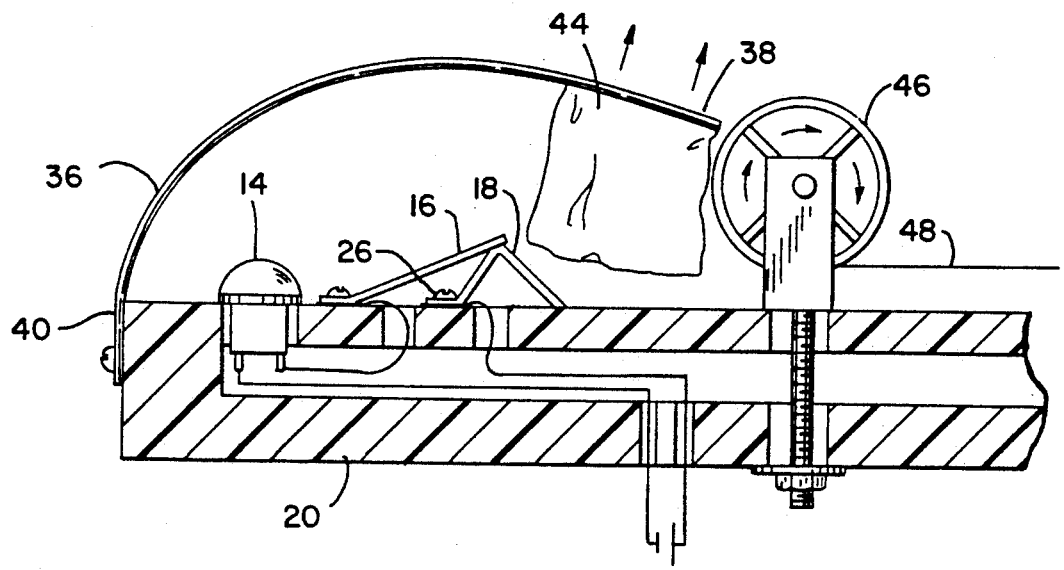
FIG. 2 is a perspective view of the invention when the indicator is activated.

The switch is comprised of two terminals 16 and 18. As shown in FIG. 2, the terminal 16 is normally biased toward terminal 18 such that terminal 16 is in contact with terminal 18. Terminals 16 and 18 are connected to a support member 20 of a tip-up 22. Screws 24 and 26 are used to maintain the terminals on support member 20.

Line 28 interconnects the negative terminal 29 of visual indicator 14 with ground. Line 30 interconnects the positive terminal of the visual indicator 14 with terminal 16. Line 34 interconnects terminal 18 with the power source, FIG. 1. When switch 12 is in a closed position, as depicted in FIG. 2, a closed circuit exists between the power source and the visual indicator 14 such that the visual indicator is activated.

Figure 3:
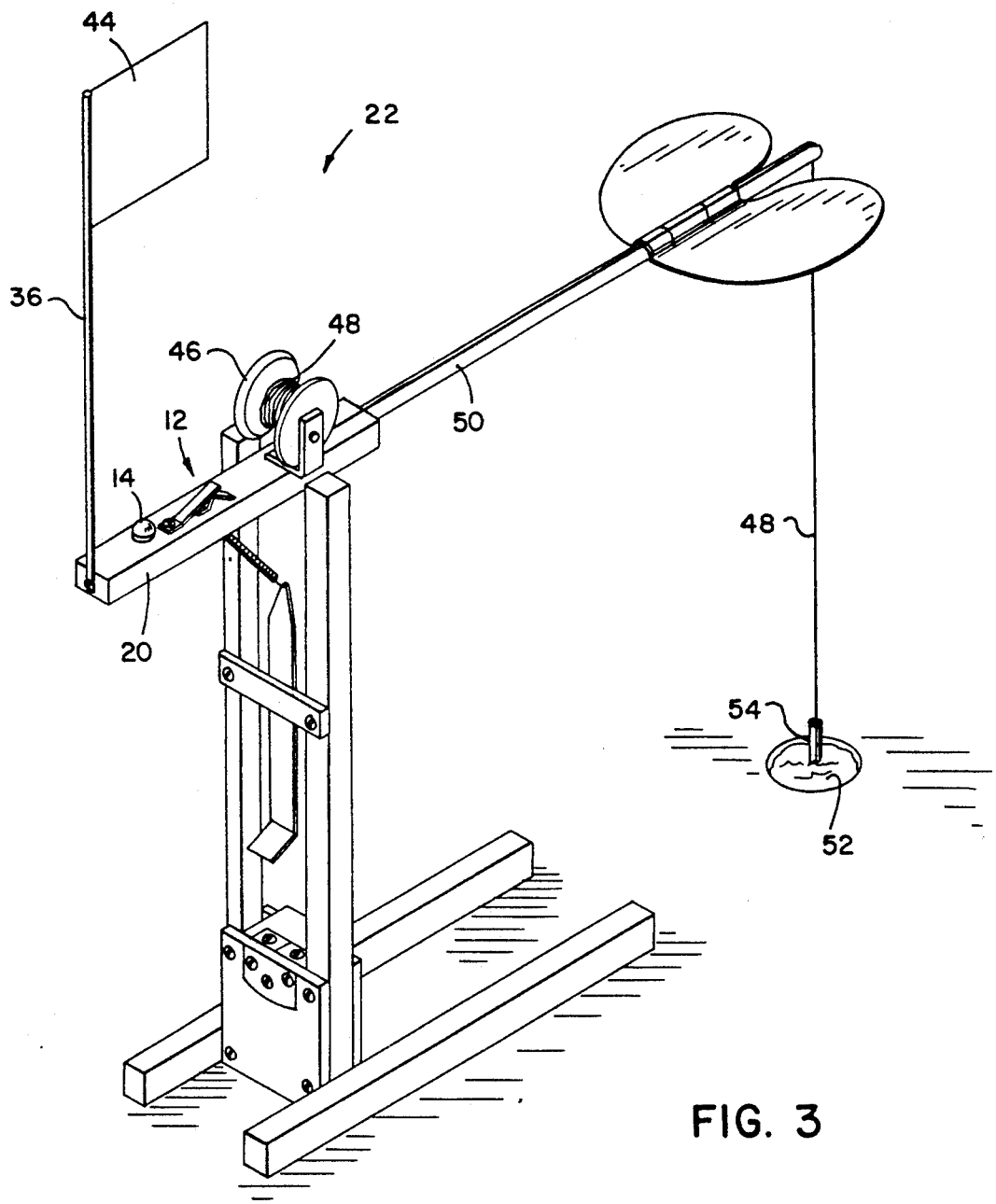
FIG. 3 is a perspective view of a tip-up.

A flexible elongated pole 36 having a first end 38 and a second end 40 is also provided. Like the terminals 16 and 18 of switch 12, elongated pole 36 is affixed to support member 20 by means of a screw 42. The pole is movable between a first set position, as depicted in FIG. 1, and a second erect, alert position, as depicted in FIG. 3. A flag 44 is affixed to the pole.

Also mounted on support 20 is a spool 46. Fishing line 48 is wound on the spool 46. The fishing line 48 extends from the spool 46, along pole 50, and down into the water 52. A tube 54 is placed about the fishing line 48 in the water 52 in order to prevent the fishing line 48 from freezing in the water 52.

In operation, an insulator is placed between terminals 16 and 18 of switch 12. When a fish strikes the baited hook, the fishing line 48 realizes an increase in tension. This increase in tension is designed to remove the insulator from between the terminals, thereby closing switch 12 and activating the visual alarm 14.

As shown in FIG. 1, flexible pole 36 may be ben such that end 38 is braced against spool 46. In such cases, flag 44 may be used as the insulator. The flag 44 is placed between terminals 16 and 18, thereby opening switch 12. As previously stated, when a fish strikes the baited hook, the line 48 realizes an increase in tension. This increase in tension causes spool 46 to rotate. The rotation of spool 46, in turn, causes the end 38 of pole 36 to release. The released pole 36 returns to its erect, alert position depicted in FIG. 3. This movement of pole 36 to an erect position removes flag 44 from between terminals 16 and 18 of switch 12. Being that terminal 16 is normally biased against terminal 18, the removal of flag 44 from between the terminals 16 and 18 closes switch 12. The closure of switch 12 completes the circuit between the visual illuminating device 14 and the power source. As a result, the device 14 is illuminated and the fisherman is alerted that a fish has engaged the hook of the tip-up.

In an alternate embodiment, fishing line 48 is placed between terminals 16 and 18 of switch 12. As previously discussed, when a fish strikes the baited hook, the line 48 realizes an increase in tension. This increase in tension causes line 48 to be removed from between terminals 16 and 18. Being that terminal 16 is normally biased against terminal 18, the removal of line 48 from between the terminals causes switch 12 to close. The closure of switch 12 allows completion of the circuit between visual indicator 14 and the power source, thereby visually alerting a fisherman that a fish has engaged the hook of the tip-up 22.

It can be seen from the above description that the invention accomplishes at least all of its stated objectives.

I claim:

1. A device for activating an audible or visual indicator on an ice fishing tip-up having a spool and fishing line wound on the spool, comprising:
    an elongated, flexible pole having first and second ends, the pole movable from a first set position to a second alert position in response to an increase in tension in the fishing line;
    a switch interconnecting the indicator to a power source, the switch having first and second terminals normally biased toward a closed position such that the first terminal is in contact with the second terminal;
    a flag affixed to the elongated pole for use as an insulator between the terminals of the switch when the pole is in the set position; and
    means for removing the flag from between the terminals of the switch in response to an increase in tension in the fishing line.

2. A device for activating an audible or visual indicator on an ice fishing tip-up having a spool and a fishing line wound on the spool, comprising:
    a witch interconnecting the indicator to a power source, the switch having first and second terminals normally biased toward a closed position wherein the first terminal is in contact with the second terminal;
    an elongated flexible pole having first and second ends, the pole movable from a first set position to a second, alert position in response to an increase in tension in the fishing line;
    a flag affixed to the elongated pole of the tip-up, the flag placed between the first and second terminals of the switch such that the first and second terminals are not in contact; and
    means for removing the flag from between the terminals in response to an increase in tension in the fishing line.

3. A device for activating an audible or visual indicator on an ice fishing tip-up having a spool and a fishing line wound on the spool, comprising:
    a switch interconnecting the visual indicator to a power source, the switch having first and second terminals normally biased toward a closed position when the first terminal is in contact with the second terminal;
    a section of fishing line placed between the first and second terminals of the switch such that the first and second terminals are not in contact; and
    means for removing the section of fishing line from between the terminals in response to an increase in tension in the fishing line.

4. A method for activating an audible or visual indicator on the ice fishing tip-up having a spool and a fishing line wound on the spool, comprising:
    providing a switch to interconnect the audible or visual indicator to a power source, the switch having first and second terminals normally biased toward a closed position such that the first terminal is in contact with the second terminal;
    inserting a section of fishing line between the terminals of the switch such that the first and second terminals are not in contact; and
    removing a section of fishing line from between the terminals in response to an increase of tension in the fishing line.

5. A method of claim 4 wherein the section of fishing line is an insulator.

6. A method for activating an audible or visual indicator on an ice fishing tip-up having a spool and a fishing line wound on the spool, comprising:
    providing a switch to interconnect the audible or visual indicator to a power source, the switch having first and second terminals normally biased toward a closed position such that the first terminal is in contact with the second terminal;
    providing an elongated flexible pole having a first and second ends, the pole movable from a first set position to a second alert position in response to an increase in tension in the fishing line;
    affixing a flag to the elongated pole;
    placing the flag between the terminals of the switch as an insulator such that the first and second terminals are not in electrical contact; and
    removing the flag from between the terminals in response to an increase in tension in the fishing line.

* * * * *